July 1, 1941. P. UZCUDUN ET AL 2,248,029
INTERNAL COMBUSTION ENGINE
Filed Oct. 22, 1938 7 Sheets-Sheet 1

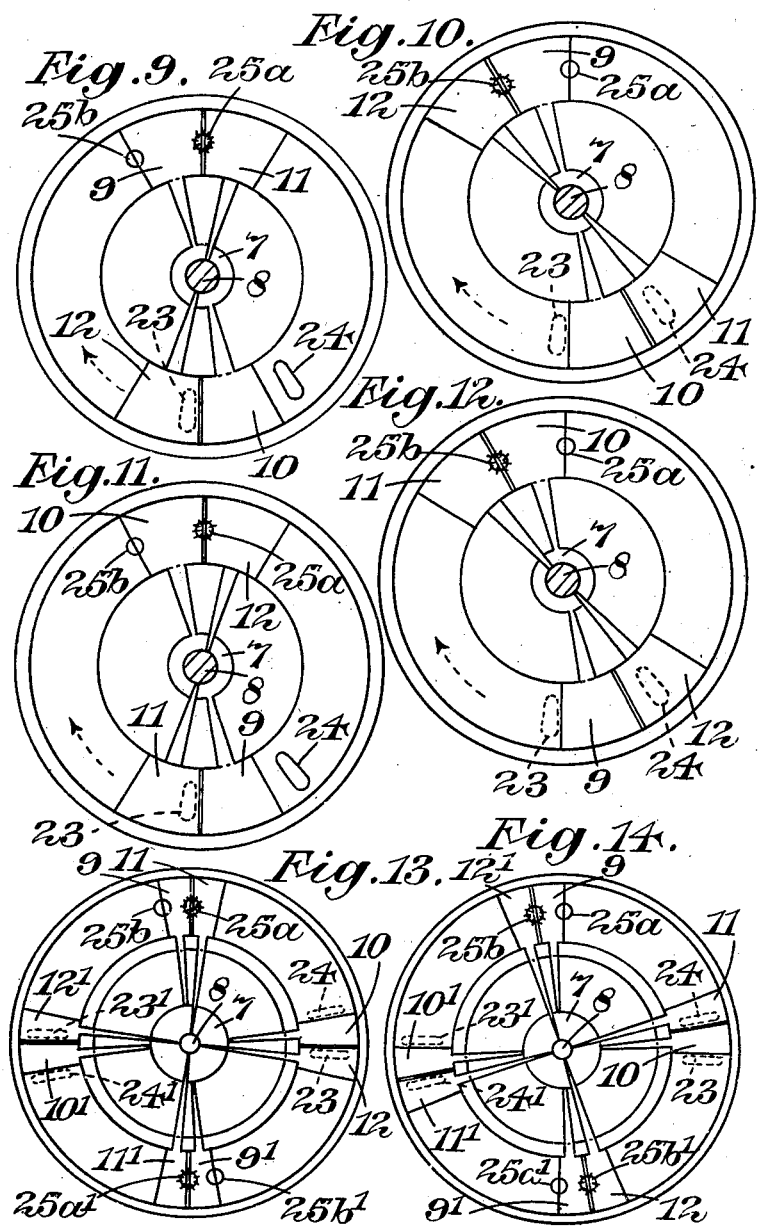

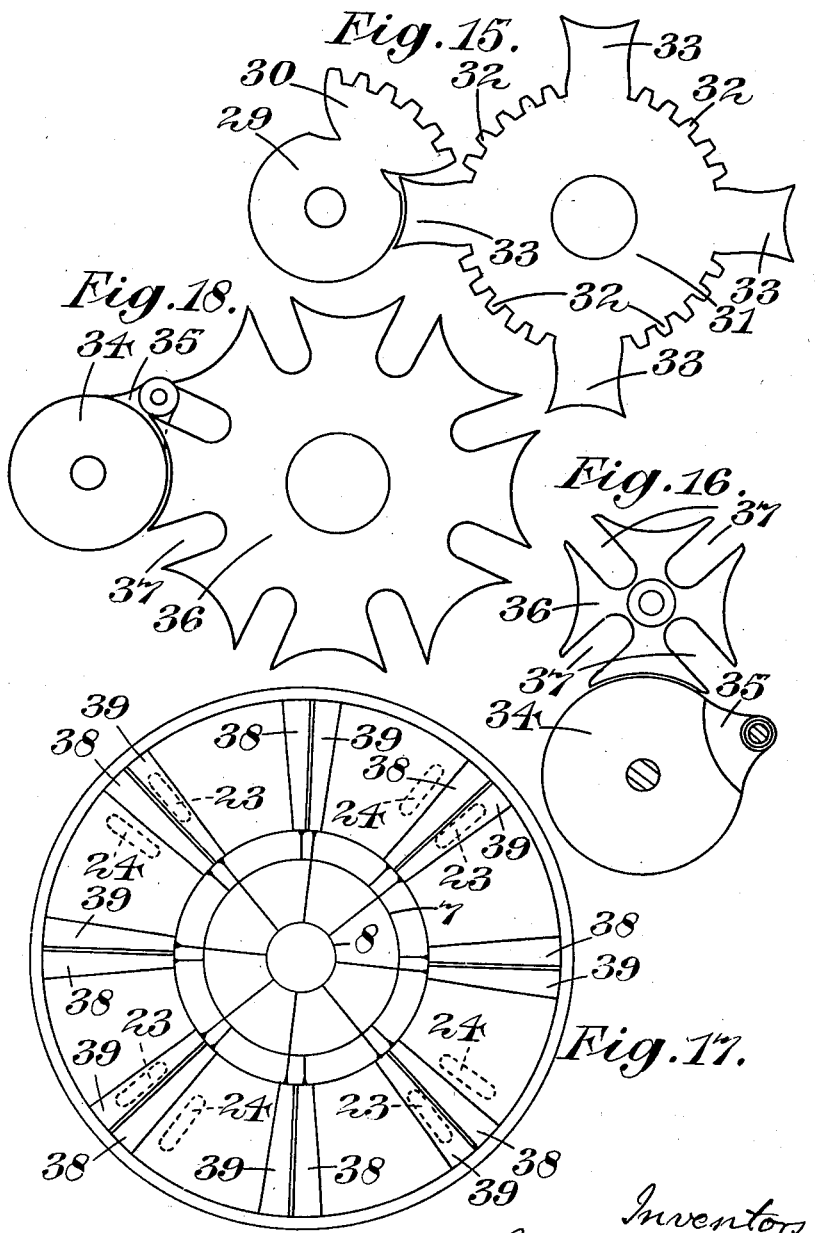

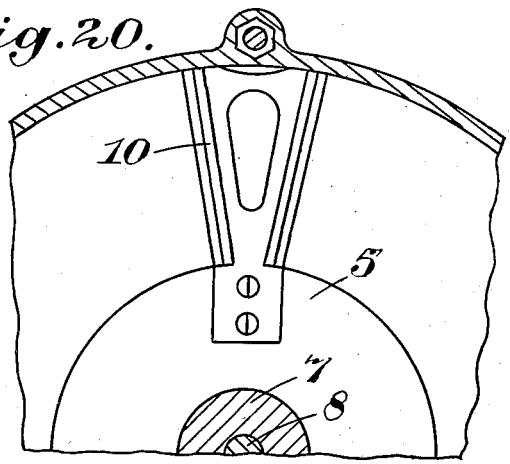
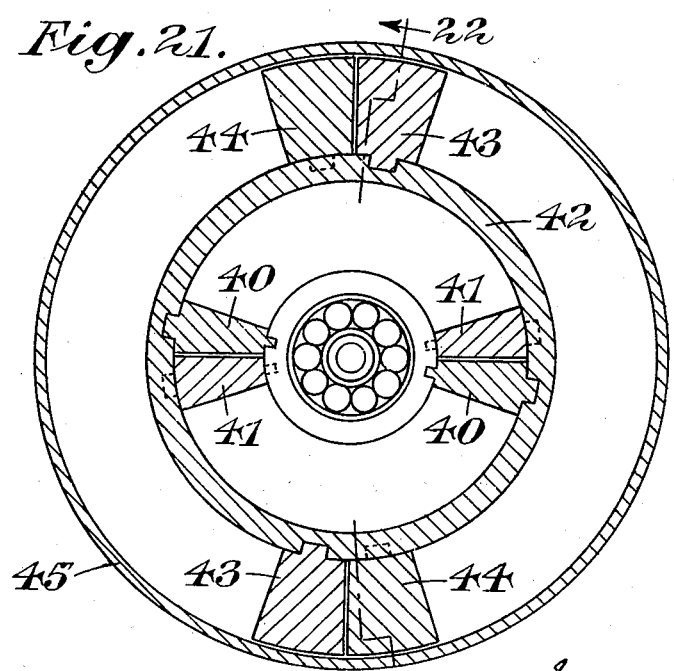

Patented July 1, 1941

2,248,029

UNITED STATES PATENT OFFICE 2,248,029

INTERNAL COMBUSTION ENGINE

Paulino Uzcudun, José Maria Elustondo, Pablo Galarraga, and Saturnino Zuloaga, San Sebastian, Spain Application October 22, 1938, Serial No. 236,442
In Spain December 4, 1937

11 Claims. (Cl. 123—11)

This invention relates to internal combustion engines of the rotary type, as distinguished from internal combustion engines of the reciprocating piston type. The advantages of the present engine over engines of the reciprocating piston type are many. As the engine rotates on its own axis, the losses of power caused by the weight of the members for the indirect transmission of movement: crank, connecting rods, valves, cam shaft, etc. are eliminated. Another advantage of the present engine is that as the explosions always propel the pistons in the same direction of rotation, the pistons thus do not change their direction of movement. Dead centres do not therefore occur and as the pistons act directly on the driving shaft, the engine tends to accelerate. Another advantage consequent upon the preceding advantage is that the single direction of rotation makes it easy to provide ball bearings, diminishing the friction and increasing the efficiency and smooth running of the engine. Another of the advantages of the engine according to the invention is that by utilising for the cylinder the circular casing of the engine, the resistance on the driving shaft is diminished in the length of the radius considered as lever. In the known crank shafts, the length of the radius on which the piston acts does not exceed six or seven centimetres, while in an engine like that proposed with a diameter of, for example, one metre, which is less than the size of the internal combustion engines at present in use, principally in aviation, this lever arm will be fifty centimetres. It facilitates the acceleration of the engine and the attainment of a higher speed, and hence the number of explosions in the same unit time. Another of the advantages of the present engine is that as the movement of the piston is rotary, the development of the circumference is available for the expansion of the gases, as compared with the engine having a longitudinal stroke. Another of the advantages of the proposed engine is that there is no operating time lost, suction, compression and exhaust of the burnt gases being effected cyclicly and alternately. Another advantage is that the two pistons operate alternately as motor and compressor and this, in combination with the foregoing, makes it possible to obtain in a single cylinder a number of explosions geometrically proportional to the groups of pistons of the engine. Thus, in an engine one metre in diameter with eight sparking plugs, up to 64 explosions per engine revolution are obtained. From all this it follows that engines constructed in accordance with the invention may be small in size and of light weight and yet may be of high horse power.

Another advantage of the present engine is the facility afforded for coupling such engines in series.

A number of forms of rotary explosion engine constructed according to the invention are described hereafter with reference to the accompanying drawings, in which:

Figures 5 to 7 are respectively a perspective view of a complete piston element, a corresponding view with a cover plate removed and a sectional view showing constructional details;

Figure 8 is a diagrammatic view indicating a preferred form of the combustion space formed by two pistons;

Figures 9 to 12 illustrate diagrammatically the successive stages in a complete cycle of the engine;

Figures 13 and 14 are diagrammatic illustrations of a modified form of rotary explosion engine;

Figure 15 is a view corresponding to Figure 4 of the modified distribution gear for use with the construction of Figures 13 and 14.

Figure 16 is a modified form of the distribution gear shown in Figure 15;

Figure 17 is a diagrammatic illustration of a further form of rotary explosion engine according to the invention, and Figure 18 is a view corresponding to Figure 4 showing the distribution gear for this construction;

Figures 19 and 20 are a longitudinal section and a detail view of a further modification;

Figure 21 is a diagrammatic sectional view of yet another form of rotary explosion engine according to the invention.

Figure 1:
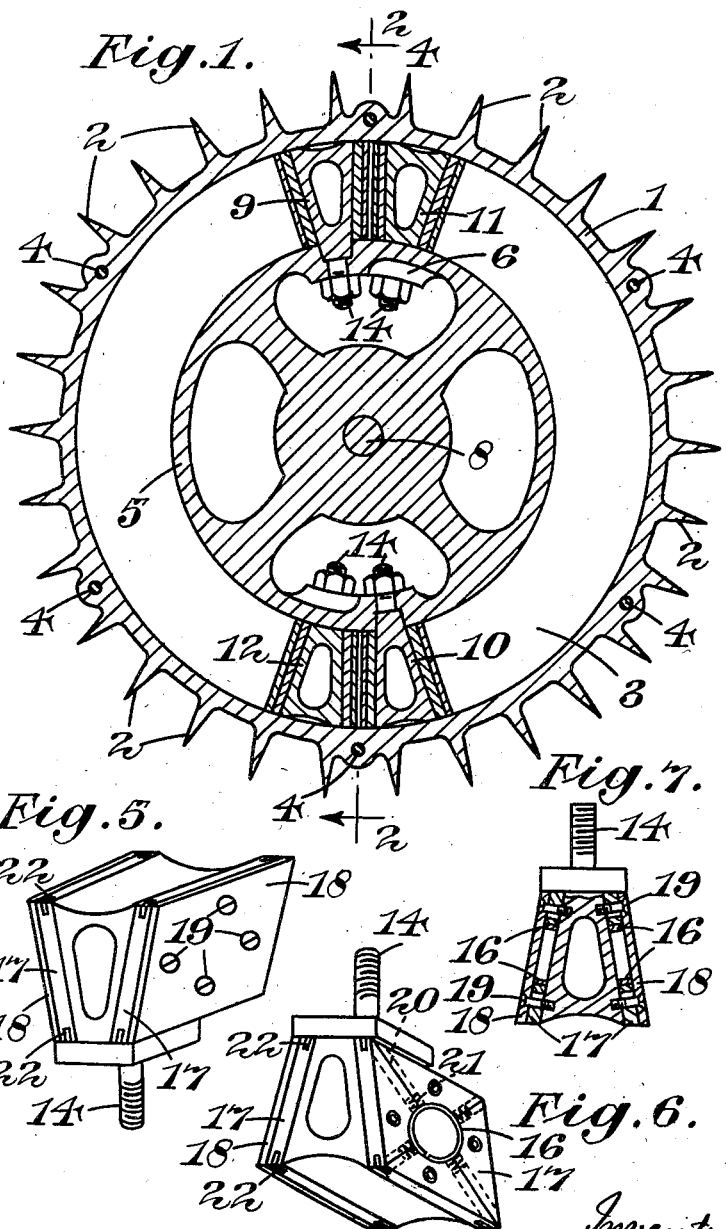
Figure 1 is a diagrammatic sectional elevation of one construction of internal combustion engine according to the invention taken on the line I—I of Fig. 2.
Figure 2:
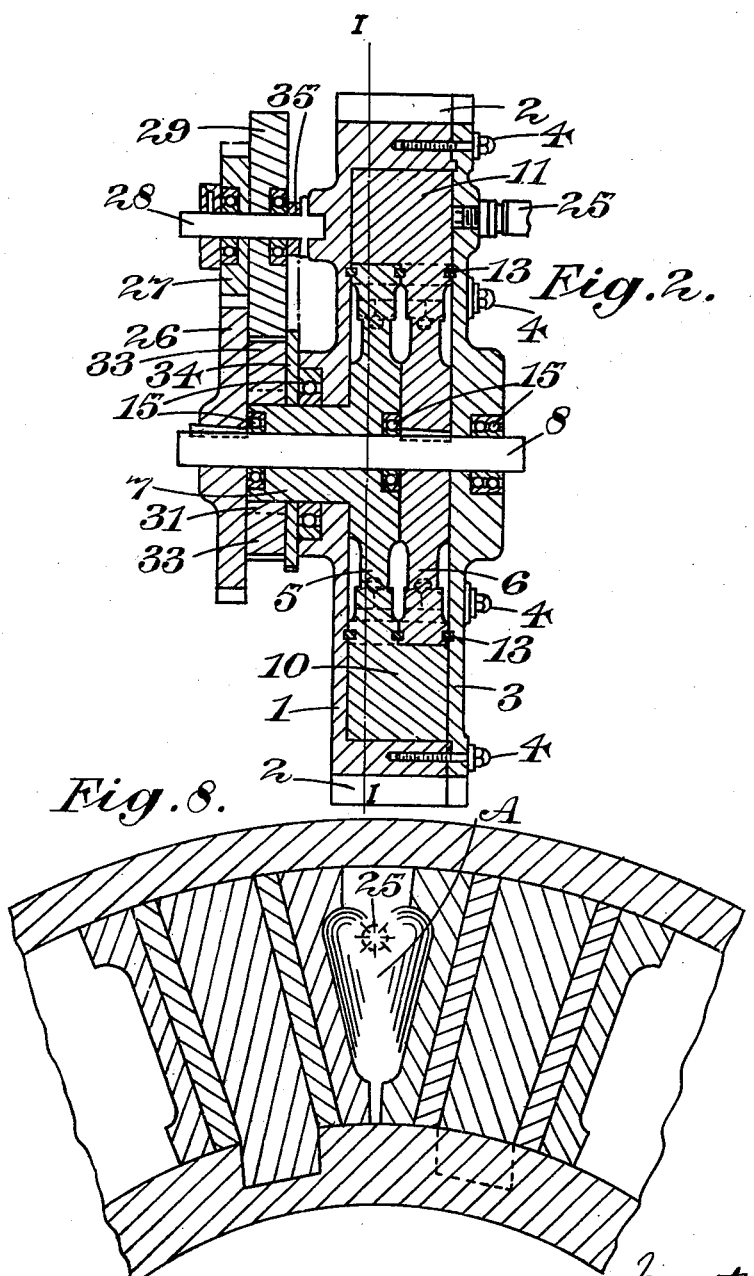
Figure 2 is a section on the line 2—2 of Figure 1.

Referring to Figures 1 and 2, a cylindrical casing 1 which may be provided with a number of cooling fins 2, or which may be water cooled in the ordinary way, is closed by an end cover 3 secured by means of bolts 4 (Fig. 2). Within the cylindrical casing are mounted two wheels 5 and 6 arranged side by side and carried by concentric shafts 7 and 8 respectively. The shaft 7 is a boss integral with the wheel 5 and loosely mounted on the shaft 8 to which the wheel 6 is keyed. The wheels 5 and 6 each carry two diametrically opposed piston elements 9, 10 and 11, 12 respectively, which in width are substantially equal to the width of the casing 1. A pair of adjacent pistons form with the casing 1 and the cover 3 a chamber of rectangular cross-section and of circular plan, which chamber is sealed in a gas-tight manner by sealing rings 13. The piston elements are secured to the wheels 5 and 6 by bolts 14.

The mounting of the concentric shafts 7, 8 on one another, and of said shafts within the casing 1 is effected by means of ball bearings 15 provided between the two wheels 5 and 6.

A gas-tight seal is secured between a piston element and the walls of casing 1 in the manner illustrated in Figures 5 to 7. In the interior of the piston there is a suitable spring 16 which acts on rhomboidal sealing members 17 protected by a cover plate 18 secured by four screws 19 engaging four threaded holes in the piston. To prevent the separation of the sealing members 17 producing pressure leaks at the edges, there are provided four rods 20 supported by four springs 21 in four grooves 22; for pressing these rods outwards it is also possible to employ another suitable spring such as 16. This system has the advantage that it facilitates dismantling of the engine without the parts falling out and permits a more simple assembly. For reducing the weight, the piston is hollow in its interior.

In the cover of the cylindrical casing 1 (Figure 3) there are formed two ports: one 23 forming the inlet port for the combustion gases and the other 24 forming the exhaust port for the burnt gases and in the opposite side at points almost diametrically opposite are ordinary sparking plugs 25.

The explosion chambers may be constructed of various forms so that they will be most appropriate for turbulence. One of these chambers is indicated at A in Figure 8 and in this construction, as the pistons form a triangular chamber arranged in such a manner that the line bisecting the isosceles angle is a radius of the engine and the base angles are curved, on compression at high speed there will be produced a rotary movement of the gases in the form of an eddy which will facilitate the combustion.

Figure 3:
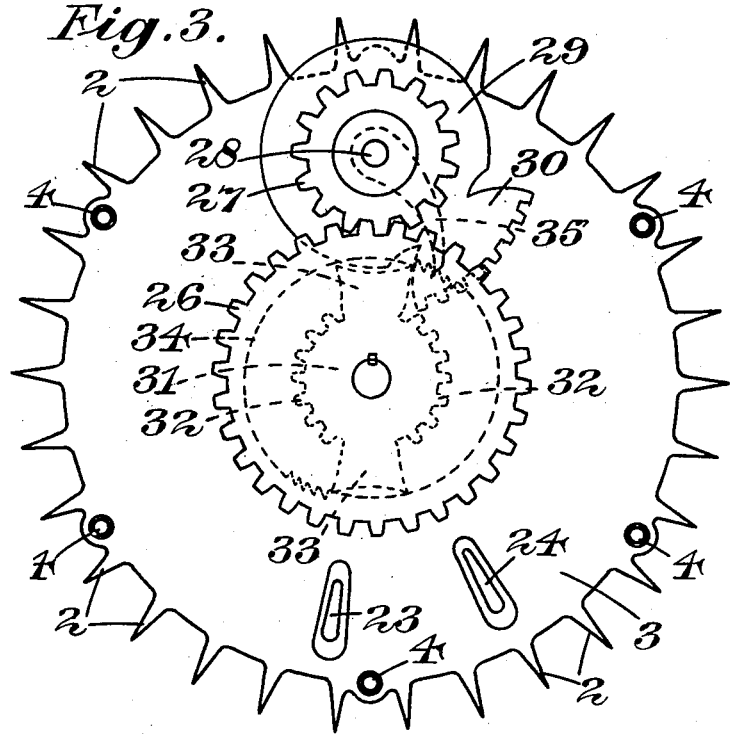
Figure 3 is an end elevation of Figure 2.
Figure 4:
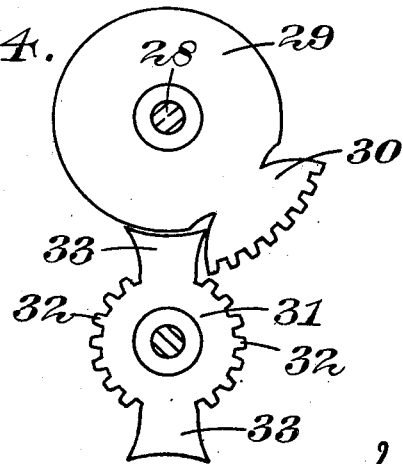
Figure 4 is a detail view of Figure 3.

The distribution gear connecting the two wheel carrying shafts 7 and 8 is illustrated in Figures 2 to 4. On the shaft 8 is mounted a toothed wheel 26, which meshes with another 27 of half the diameter or other suitable diameter mounted and carried on a parallel shaft 28 secured in the casing 1, the toothed wheel 27 making, therefore, twice the number of revolutions or other corresponding number of revolutions per revolution of the wheel 26. This toothed wheel 27 is fixed with respect to a part 29 of a distributing device of special form which comprises the part 29 having a segmental toothed projection 30 and a part 31 which is mounted on the shaft 7. The part 31 comprises two segmental toothed parts 32 which co-operate with the teeth on the projection 30, and two oppositely disposed, radially extending portions 33, which cooperate with a circular peripheral portion of the wheel 27 to hold the shaft 7 against rotation when the teeth of the segmental projection 30 are not in mesh with the teeth of either of the segmental parts 32.

A ratchet wheel 34 is secured to the shaft 7 and is engaged by a pawl 35 which prevents rotation of the shaft 7 in one direction. It will be clear that the shafts 7 and 8 are drivingly connected together while the part 30 is meshed with either of the toothed portions 32 of the part 31. Thus, said shafts 7 and 8 are connected together twice during each revolution of shaft 8 and during each connection shaft 8 is driven by shaft 7 through a reduction ratio of four to one.

During a complete engine cycle, which is illustrated diagrammatically in Figures 9 to 12, the pistons 9, 10, 11, 12 each make a complete revolution without change of direction or dead centres, expel the burnt gases, draw in combustion mixture and compress simultaneously another charge of the mixture, the pistons on the shafts being employed alternately for propelling the driving shaft. During each cycle, a piston performs a distinct function in each of its two stages of travel. The operation of the engine described is as follows: The piston 11 of the shaft 8 commences its stroke when the sparking plug 25a ignites the combustion mixture compressed between pistons 9 and 11 (Figure 9) and during the first part of its travel expels the gases of the previous combustion through exhaust port 24 and then closes the exhaust port. During this movement the piston 12 is compressing a combustion charge and at the same time drawing in a fresh charge through inlet port 23. The pistons 9, 10 are stationary during this part of the engine cycle. The parts are now in the positions illustrated in Figure 10. The sparking plug 25b now ignites the compressed combustion mixture between pistons 12 and 9 and as a result piston 9 and the shaft 7 and piston 10 are driven at high speed in a clockwise direction and due to distribution gear connecting the shafts 7 and 8, the shaft 8 and pistons 11 and 12 follow at a much reduced rate; this movement of piston 11 uncovers the exhaust port permitting expulsion of exhaust gases of the previous explosion and continues until the piston 11 reaches the position of Figure 11. During this movement, a fresh charge has been drawn into the space between pistons 10 and 11 and the charge between pistons 10 and 12 compressed. When the pistons reach the positions of Figure 11, sparking plug 25a ignites the charge between pistons 10 and 12, and the parts move to the positions in Figure 12, the pistons 10 and 9 being stationary during this time. Sparking plug 25b then ignites the charge between pistons 10 and 11 and the parts are driven back to their initial positions (Figure 9).

It will be seen, therefore, that four propulsive explosions occur during each revolution of the engine, and that the sparking plugs fire alternately. Moreover, there is clearly no position of "dead centre" nor do the pistons change their direction of travel.

It will be understood from the foregoing description that pistons 9, 10 have a double function of setting in motion the distribution gearing and of effecting a driving action. It is therefore essential that the driving connection between the shafts 7, 8 be effected at the moment at which the sparking plug 25b ignites an explosive charge.

The engine illustrated in Figures 13 and 14 has, as in the previous construction, two wheels mounted on shafts 7, 8, but in this case, each wheel has four pistons 9, 9', 10, 10' or 11, 11', 12, 12', symmetrically arranged on its periphery. There are two inlet ports 23, 23', two exhaust ports 24, 24' and four sparking plugs 25a, 25b, 25a', 25b'. Figure 13 corresponds to Figure 9 and it will be clear that two explosions occur simultaneously propelling the pistons 11 and 11'. Likewise at the second stage two further explosions occur acting on pistons 9, 9'. The remaining stages in the engine cycle may be represented alternately by Figures 13 and 14 except that the pistons occupy successive positions in a clockwise direction.

The parts 29 and 31 of the distribution gear of the previously described construction are replaced by parts comprising a member 31 having four toothed portions 32 and four projections 33 and a member 29 having a toothed projection 30 as shown in Figure 15.

For the distribution gear in this case, in which the number of stages is double that of the previous case, the space without teeth is calculated so that the projections 33 bear on the entire non-toothed circle, thus arresting all movement of the part 31 until, following its stroke, the part 29, which moves four times as rapidly or at some other suitable speed, in its turn imparts its rapid movement to the gear by means of the said projections 33 which engage with the projection 30.

Another form of the distribution mechanism for this engine construction is that shown in Figure 16, in which the disc 34 is driven by the shaft 8 and carries a projection 35 which acts on the Maltese cross member 36 by means of the four grooves 37. When the shaft 7 has travelled over three quarters of its stroke, the projection 35 engages a groove 37 and drives the gear wheel 5, such that for every four revolutions of the disc 34 there is one of the member 36.

A consequence of the successive operation of the pistons is that the explosions taking place in this case in one revolution of the engine increase from four to sixteen. In this case, the operation of the exhaust, suction and compression is the same as in the previous case, except that each piston performs a cycle of operations in 180° of travel and first one pair and then the other pair of the four sparking plugs operate simultaneously.

The number of piston arms may be increased in suitable proportions for engines of large diameter and the stroke of the pistons will be limited by the efficient operation of the suction and compression of the gases, and with the advantage that the number of explosions which take place in a complete cycle of the engine increases in proportion. Thus, for example, in an engine of one metre diameter, each shaft may carry eight pistons 38, 39 and there will be 64 explosions, each piston completing a cycle of operation in each 90 degrees of travel. Such an engine is illustrated in Figure 17, and Figure 18 shows the modified distribution gear for this engine construction.

Figure 19:
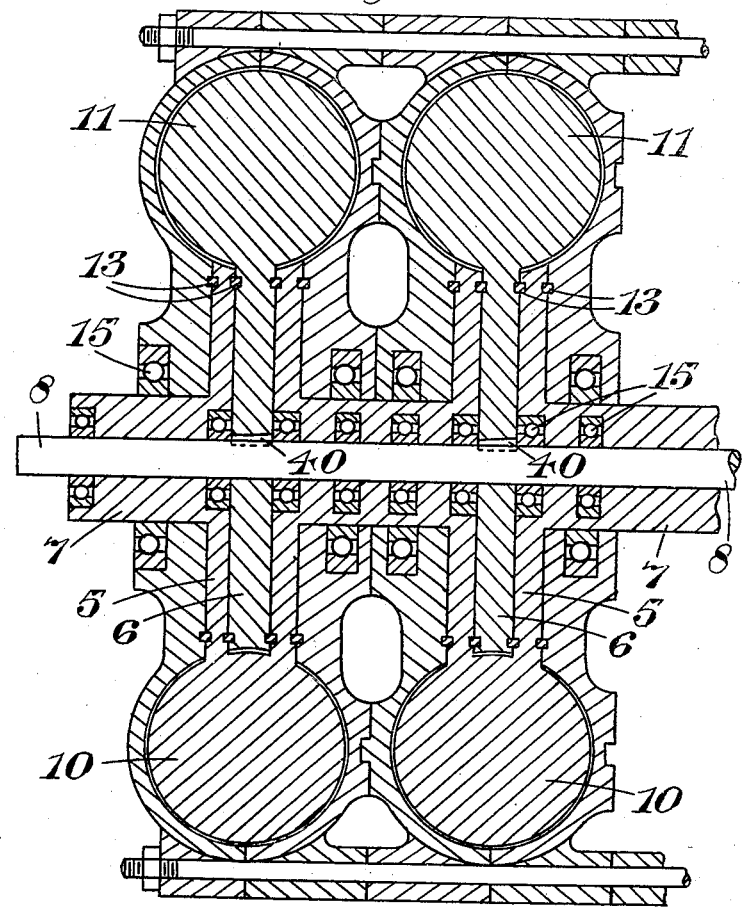
Figure 22:
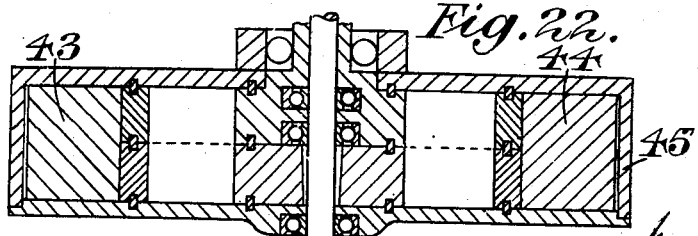
Figure 22 is a section on the line 22—22 of Figure 21.

Another advantage possessed by the rotary explosion engine is the facility with which a number may be mounted together. In Figure 19 is shown the manner of mounting the engines side by side. The shafts 7, 8 are common to both engines, and the pistons 10, 11 which in this case are cylindrical, are connected by their wheels 5 and 6 respectively to the shafts. The connection with the shaft 8 is by means of keys 48. The wheel 15 is integral with its shaft 7. This considerably simplifies the assembly of this class of engine. Figure 20 is a broken elevational view of the engine showing the form of the piston which is not modified except that the sealing of the pistons in the chamber is effected by means of ordinary piston rings.

Figure 21 is a plan view of a construction in which two engines are concentrically mounted. In this case, the pistons 40, 41 of the inner engine are fixed to the outer walls 42 of that engine, the pistons 43, 44 of the outer engine also being connected to the walls 42. Simultaneous explosions are effected by reason of the fact that the inner and outer pistons are coupled together, and the inlet and exhaust ports and sparking plugs are in the non-rotating outer walls 45.

We claim:

1. A rotary explosion engine comprising a casing having a portion thereof formed as an annular chamber and having intake and exhaust ports formed in the wall thereof and opening into the chamber, a pair of coaxially arranged shafts mounted in said casing concentrically with the annular chamber, a wheel carried by each shaft, a pair of piston members carried by each wheel and arranged thereon diametrically opposite each other, said piston members being adapted to work within the annular chamber, a gear wheel mounted on one of said shafts, an auxiliary shaft mounted on said casing, a second gear wheel carried by the auxiliary shaft and meshing with first said gear wheel, a member secured to said second gear wheel and having a toothed segmental extension, a member mounted on the other of said shafts and comprising a pair of segmental toothed portions adapted to engage with the segmental toothed extension, the gear wheels and the members having the toothed segmental portions being such that the shaft carrying the first said gear wheel intermittently connected with the shaft carrying the member having two segmental toothed portions twice during each revolution of said first gear carrying shaft and during said connection the latter is driven by the shaft carrying the member having the two peripheral toothed portions at a reduction ratio of four to one, means for preventing rotation of the shafts in one direction of rotation, and sparking plugs mounted in the wall of the annular chamber, the ports and sparking plug means being arranged so that for each revolution of the engine there are at least four propulsive explosions.

2. A rotary explosion engine comprising a casing having a portion thereof formed as an annular chamber and having intake and exhaust ports formed in the wall thereof and opening into the chamber, a pair of co-axially arranged shafts mounted in said casing concentrically with the annular chamber, a wheel carried by each shaft, a pair of piston members carried by each wheel and arranged thereon diametrically opposite each other, said piston members being adapted to work within the annular chamber, a gear wheel mounted on one of said shafts, an auxiliary shaft mounted on said casing, a second gear wheel mounted on the auxiliary shaft and meshing with first said gear wheel, a member secured to and rotating with said second gear wheel and having a toothed segmental extension, a member carried by the other of said shafts and comprising a pair of segmental toothed portions adapted to engage with the segmental toothed extension, the gear wheels and the members having the toothed segmental portions being such that the shaft carrying first said gear wheel is intermittently connected with the shaft carrying the member having two segmental toothed portions twice during each revolution of said first gear carrying shaft and during said connection the latter is driven by the shaft carrying the member having the two peripheral toothed portions at a reduction ratio of four to one, means for preventing rotation of the shafts in one direction of rotation, and a pair of alternately operating sparking plugs mounted in the wall of the annular chamber, said sparking plugs being angularly spaced apart by an amount equal to the width of a piston element and said ports being disposed substantially diametrically opposite said sparking plugs.

3. A rotary explosion engine comprising a casing having a portion thereof formed as an annular chamber and having intake and exhaust ports formed therein opening into the chamber, a pair of shafts mounted in the casing co-axially with the chamber, a plurality of pairs of piston members secured to each shaft and disposed symmetrically around the shaft, means preventing the rotation of the shafts in one direction of rotation, means drivingly connecting said shafts for a part of the revolution of the engine only, so that during the rotary movement of one shaft the other shaft is stationary and so that during rotation of said stationary shaft the first said shaft is driven at a reduced speed, and sparking plug means for effecting explosion of a combustible mixture arranged in the wall of the annular chamber, there being a pair of ports for each pair of pistons carried by a shaft and a pair of sparking plugs corresponding to each pair of piston members carried by each shaft, the pairs of sparking plugs being symmetrically arranged around the casing and the pairs of ports being formed in the casing intermediate of pairs of sparking plugs, the sparking plugs of each pair being spaced apart angularly of the annular chamber and being alternately operable, each to initiate a power impulse of the engine separate from the power impulse initiated by operation of the other.

4. A rotary explosion engine comprising a casing having a portion formed as an annular chamber and having intake and exhaust ports formed therein and opening into the chamber, a pair of shafts mounted in the casing concentrically with the annular chamber, four piston members secured to each shaft and symmetrically disposed with respect to one another and working within the annular chamber, means for preventing rotation of said shafts in one direction of rotation and means connecting the shafts during a part of a revolution of the engine, said connection being such that one shaft rotates at a greater speed than the other, and sparking plugs for effecting explosion of a combustible mixture arranged in the wall of the chamber, the ports being arranged in pairs diametrically opposite each other and the sparking plugs being arranged in pairs symmetrically between the pairs of ports, the sparking plugs of each pair being spaced apart angularly of the annular chamber and being alternately operable, each to initiate a power impulse of the engine separate from the power impulse initiated by operation of the other.

5. In a rotary explosion engine as claimed in claim 4, means for drivingly connecting the shafts comprising a gear wheel mounted on one of said shafts, an auxiliary shaft, a gear wheel carried by said auxiliary shaft and meshing with first said gear wheel, a member having a toothed peripheral extension rotatably secured to said second gear wheel, a member mounted on the other of said shafts and having four toothed peripheral portions arranged to mesh with the toothed peripheral projection, said means being such that the shaft carrying the first said gear wheel is intermittently connected with the shaft carrying the member having the four segmental toothed portions twice during each revolution of said first gear-carrying shaft and during said connection the latter is driven by the shaft carrying the member having the four segmental toothed portions at a reduction ratio of four to one.

6. A rotary explosion engine as claimed in claim 4, means for drivingly connecting said shaft comprising a gear wheel mounted on one of said shafts, an auxiliary shaft, a gear wheel carried by said auxiliary shaft and meshing with first said gear wheel, a member rotatably secured to second said gear wheel having a projection carrying a pin element, a Maltese cross member secured to the other of said shafts, the pin being arranged to engage between the bars of the cross, said means being such that the shaft carrying the first said gear wheel is intermittently connected with the shaft carrying the member having the four segmental toothed portions twice during each revolution of said first gear-carrying shaft and during said connection the latter is driven by the shaft carrying the member having the four segmental toothed portions at a reduction ratio of four to one.

7. A rotary explosion engine including a casing, said casing having a portion formed as an annular chamber and having ports formed therein opening into the chamber, a pair of shafts mounted in the casing co-axially with the annular chamber, four pairs of piston members secured to each shaft and arranged symmetrically with respect to one another, means for preventing rotation of the shafts in one direction of rotation, means for drivingly connecting one of said shafts to the other of said shafts during a part of the revolution of the engine and sparking plug means arranged in the wall of the casing, said ports being arranged in pairs symmetrically with respect to each other and the sparking plug means being arranged symmetrically between the pairs of ports, the means connecting the said shafts comprising a member driven from one of said shafts so as to make two complete revolutions per revolution of said shaft and including a pin element rotating therewith, a member driven from the other of said shafts and comprising a number of peripheral extensions forming slots between themselves, the number of extensions being equal to the number of pistons carried by the shaft, said pin being adapted on rotation of the member carrying it to engage within the slots formed by said extensions so that on rotation of the member having peripheral extensions the pin carrying member rotates at half the speed.

8. In a rotary explosion engine, a piston member having a hollow body portion, a cover plate on each of a pair of opposite faces, rhomboidal sealing elements arranged between the body portion and the cover plate, said rhomboidal members having grooves formed in their adjacent edges, a sealing rod occupying each pair of adjacent grooves and spring means for urging said rhomboidal sealing members and said sealing rods outwardly of the body portion.

9. A rotary internal combustion engine comprising an annular cylinder having inlet and exhaust ports and first and second ignition devices, a pair of coaxial shafts mounted concentrically with respect to said cylinder, a first wheel member carried by one of said shafts and a second wheel member carried by the other of said shafts, a pair of diametrically opposed pistons carried by each wheel member and disposed in said cylinder, means at all times holding said first wheel member and its pistons against retrograde rotation, said wheel members having cycle starting positions in which the pistons of the second wheel member are disposed adjacent to the pistons of the first wheel member, respectively, a charge is compressed between one of the pistons of the first wheel member and the adjacent piston of the second wheel member, the inlet and the exhaust ports are disposed, respectively, in advance of and behind the other piston of the first wheel member and said first and second ignition devices are disposed, respectively, in advance of and behind the first mentioned piston of said first mentioned wheel member, the former to ignite said charge, and a connection between said shafts controlling advance rotations of the same and requiring said wheel members and their pistons to advance alternately in predetermined amounts, one at times with and at a different rate of speed than the other, so that during a single, complete cycle of operation of the engine there occur at least four intake, compression, power and exhaust operations with the power operations initiated alternately by said ignition devices.

10. In a rotary internal combustion engine of the type comprising an annular cylinder having intake and exhaust ports, a pair of wheel members each having a pair of diametrically opposite pistons disposed in said cylinder, and in which said wheel members and their pistons advance alternately to cause the drawing into the cylinder of explosive charges, the compression of said charges between approaching pistons and the exhaust of products of combustion, a pair of alternately operated ignition devices spaced apart angularly relative to said cylinder, and a connection between said wheels controlling advance of the same and their pistons relative to each other in amounts such that operation of each ignition device produces a power impulse of the engine and at least four power impulses occur during each complete cycle of operation of the engine.

11. An internal combustion engine as set forth in claim 9, in which the connection between the shafts comprises a Geneva gear.

PAULINO UZCUDUN.
JOSÉ MARIA ELUSTONDO.
PABLO GALARRAGA.
SATURNINO ZULOAGA.